United States Patent [19]
Pryor et al.

[11] Patent Number: 5,902,113
[45] Date of Patent: May 11, 1999

[54] MAP AND CALCULATOR DEVICE

[75] Inventors: Paul L. Pryor, deceased, late of Dayton; C. Robert Pryor, executor, Yellow Springs, both of Ohio

[73] Assignees: C. Robert Pryor, Yellow Springs, Ohio; William E. Pryor, Houston, Tex.

[21] Appl. No.: 08/908,374

[22] Filed: Aug. 7, 1997

Related U.S. Application Data

[60] Provisional application No. 60/023,556, Aug. 7, 1996.
[51] Int. Cl.⁶ .......................... G09B 29/00; G09B 29/10
[52] U.S. Cl. ................................... 434/153; 283/34
[58] Field of Search .......................... 283/34; 434/150, 434/153

[56] References Cited

U.S. PATENT DOCUMENTS

| | | | |
|---|---|---|---|
| D. 136,173 | 8/1943 | VonRohl | 434/150 X |
| 1,108,457 | 8/1914 | Maull | 434/153 X |
| 1,610,413 | 12/1926 | Balch | 283/34 |
| 2,397,063 | 3/1946 | VanZandt | 434/153 |
| 4,898,537 | 2/1990 | Pryor | 434/130 |

FOREIGN PATENT DOCUMENTS

| | | | |
|---|---|---|---|
| 111855 | 10/1968 | Denmark | 434/153 |
| 386155 | 1/1933 | United Kingdom | 434/153 |
| 1114185 | 5/1968 | United Kingdom | 434/153 |
| 1429655 | 3/1976 | United Kingdom | 434/150 |

*Primary Examiner*—John A. Ricci
*Attorney, Agent, or Firm*—Biebel & French

[57] ABSTRACT

A map which may also be a calculating or teaching device includes a flat representation of a planet with one hemisphere on one side and the opposite hemisphere on the opposite side. The hemispheres are projected to the same scale with matching meridian lines, an arbitrary point of interest forms the center of one side and the antipode of the point of interest forms the center of the other side. Scales are provided by which great circle routes may be plotted and measured. The maps are preferably conformed to an azimuth equidistant projection. A variation is disclosed by which the change from night and day is delineated.

8 Claims, 4 Drawing Sheets

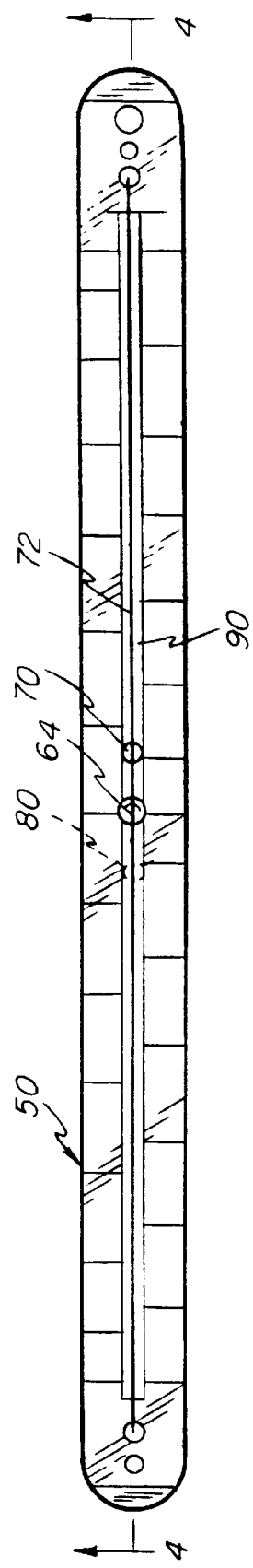
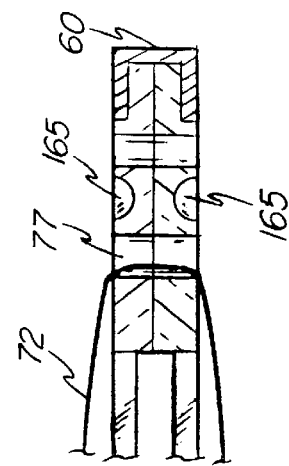
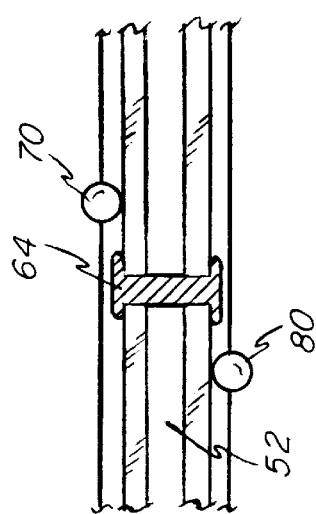
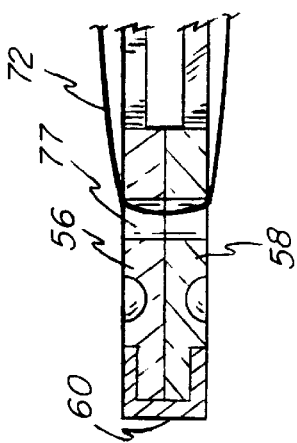
FIG-3
FIG-4

MAP AND CALCULATOR DEVICE

This application claims the priority of Provisional Application, Ser. No. 60/023,556 filed Aug. 7, 1996.

SUMMARY OF THE INVENTION

The invention relates to a map presentation, a teaching device and a calculator that includes a map of one-half of the world on one surface, such as an obverse side and the other half of the world on the reverse side. Each side thus represents a hemisphere, and the sides are related or joined together in such a manner that the meridian lines join to form a continuation of the map at the margins of the respective map sides. The center point of the first or obverse face may be located at a particular point of interest, such as a geographical location on the face of the planet, from which great circle distance measurements may be made. The antipode therefor is at the exact location on the reverse side of the map. For example, if the point of interest is Washington, D.C., the antipode is in the Indian Ocean.

A ruler or scale is attached to the map having two sides or faces, i.e., a front side, and a back side properly aligned in relation to the map and preferably joined at the margin to each other at or beyond the actual field of the map. The map is preferably circular in configuration, and the ruler may thus be rotated or pivoted about the center point through an azimuth of 360 degrees. The ruler is preferably laid out with distance markers, such as statute or nautical miles, from a zero point corresponding to the center point. In the case of the globe, and statute miles, the perimeter would be located at the approximate 6,250 mile division and the antipode would be located at the 12,500 mile division, which is the greatest distance possible by great circle route from the identified center.

Preferably, but not necessarily, the projection employed in the making of the representations on the surfaces of the map is an azimuthal equidistant projection, on which all straight lines drawn from the center, or a point of projection, represent great circles. Distances measured along such lines are equal and therefore such great circles represent the shortest distance from the given center to any other point on either side of the projection.

A two-sided ruler or scale is slipped over the map and pivoted at the center point defined by the map, with ends extending beyond the circumference of the map. A particular form of scale is disclosed in which a moveable element is mounted on one of the two scale sides and is guided for movement lengthwise along the scale, and is coupled by a flexible loop, such as a nylon wire or the like, to a corresponding element on the opposite side of the scale. The elements are exactly opposite of each other when located at the given center point and its antipode, but when one point is moved along the scale, the closed loop causes the other point to move in an opposite direction. In this manner, any point can be selected and identified by the position of one of the elements along the pivoted scale and the antipode will be represented by the element on the other side.

In another aspect of the invention, a two-sided polar map is made which an outer circumference at the equator, so that the North Pole is substantially in the center of one side of the map and the South Pole is in the center of the reverse side of the map. A specially configured semi-transparent sleeve or envelope-like member may be slid past the map and an edge thereof aligned transversely to the poles, to represent daylight and darkness. The map may thus be rotated in the sleeve about its axis to represent changes in the regions of daylight and darkness. A curved line extending from the Arctic Circle to the Equator can represent the condition of summer and winter solstice, while a straight line passing from the Pole radially to the Equator on the map represent conditions at the Equinox. A series of slots between a straight and an extreme curve slot would represent changes which occur throughout different times of the year.

It is according an important object of the invention to provide a measuring tool or teaching device in which the globe appears to be flattened with one hemisphere shown on one side of a two-sided representation and the opposite hemisphere shown on the opposite side, with the center of one of the hemispheres being located at a Pole or at a place other than a Pole, such as a particular point of interest.

An important object of the invention is the provision of a flat two-sided map of the earth in which one side, such as an obverse side, represents one hemisphere and the other side, such as a reverse side, represents the other hemisphere, in which each of the sides are drawn to the same scale and in which the meridian lines of one of the sides are brought to the margins at the same location as the corresponding meridian lines of the other side, thereby permitting great circle measurements to be made by extending the measurement from one side, about the circular margin, to the other side.

Another object of the invention is the provision of a map, as described above, in which antipodes may be determined on the opposite surfaces of the map by a pair of indicators coupled together in a closed loop surrounding the map.

Yet another object of the invention is the provision of a sleeve-like member in combination with a map, as described, in which the transition from darkness to light is represented when the map is inserted in the sleeve-like member, permitting rotation of the map therein to show the changes in relative light and dark regions, corresponding to the rotation of the planet.

A still further object of the invention is the provision of a device, as outlined above, in which a map of a planet is made with an obverse side and a reverse side, each representing approximately one hemisphere, and having an equidistant projection by means of which great circle measurements may be made or other measurements made using a uniform scale of measure.

A further object of the invention is the provision of a device, as outlined above, in which antipodal points may quickly be located.

A still further object of the invention is the provision of a product by which the change from day to night, with respect to the surface of the earth, can readily be seen for any position on the earth.

Other objects and advantages of the invention will be apparent from the following description, the accompanying drawings and the appended claims.

BRIEF DESCRIPTION OF THE DRAWINGS

FIG. 3 is an elevational view of an improved rule which may be used with the device of FIGS. 1 and 2;

FIG. 4 is an enlarged fragmentary sectional view through the rule looking generally along the line of 4—4 of FIG. 3.

DETAILED DESCRIPTION OF THE PREFERRED EMBODIMENTS

Figure 1:
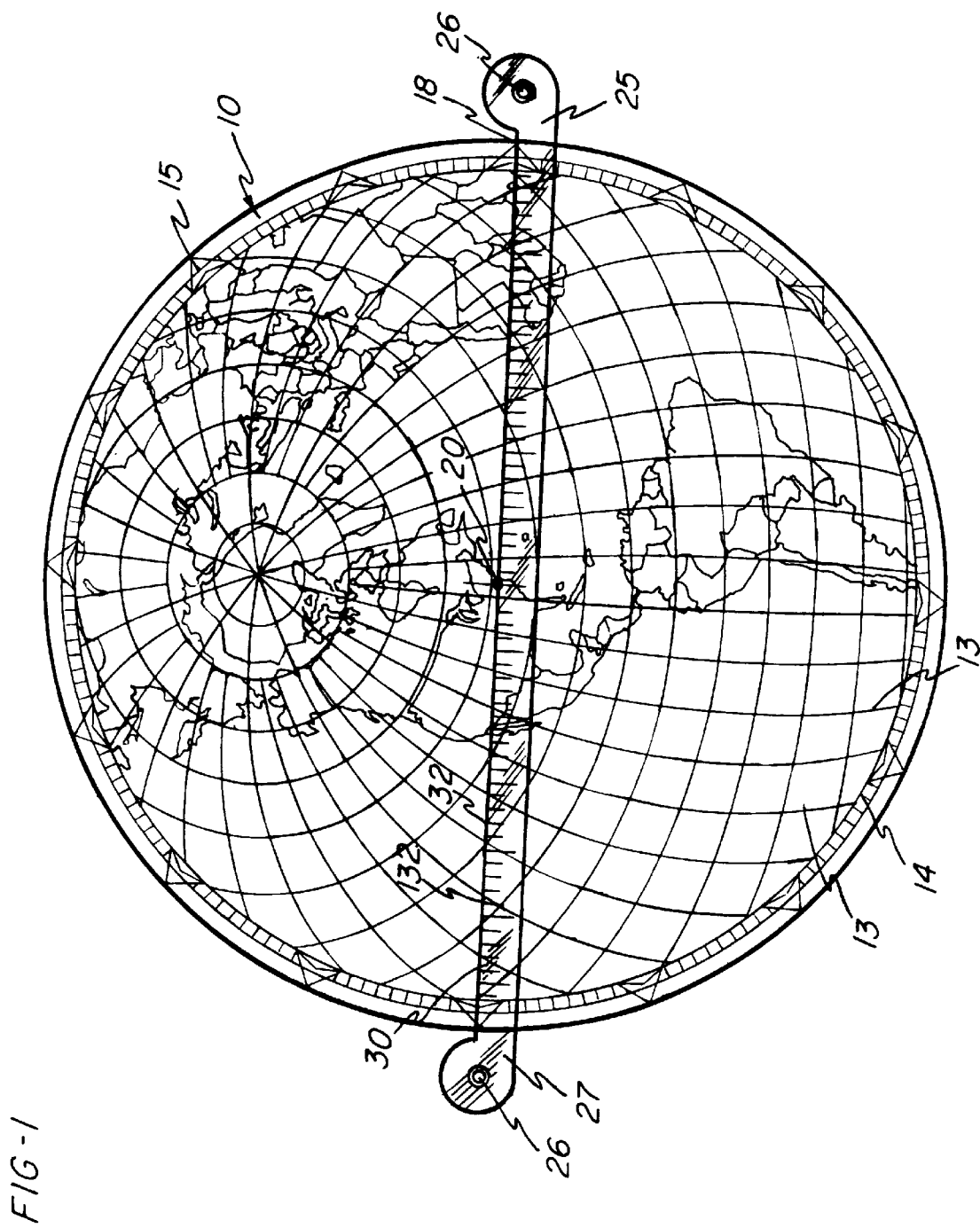
FIG. 1 is a plan view of a device according to this invention showing an obverse side of the two-sided map in which the center is approximately at Washington, D.C. and showing one form of a pivoted rule.
Figure 2:
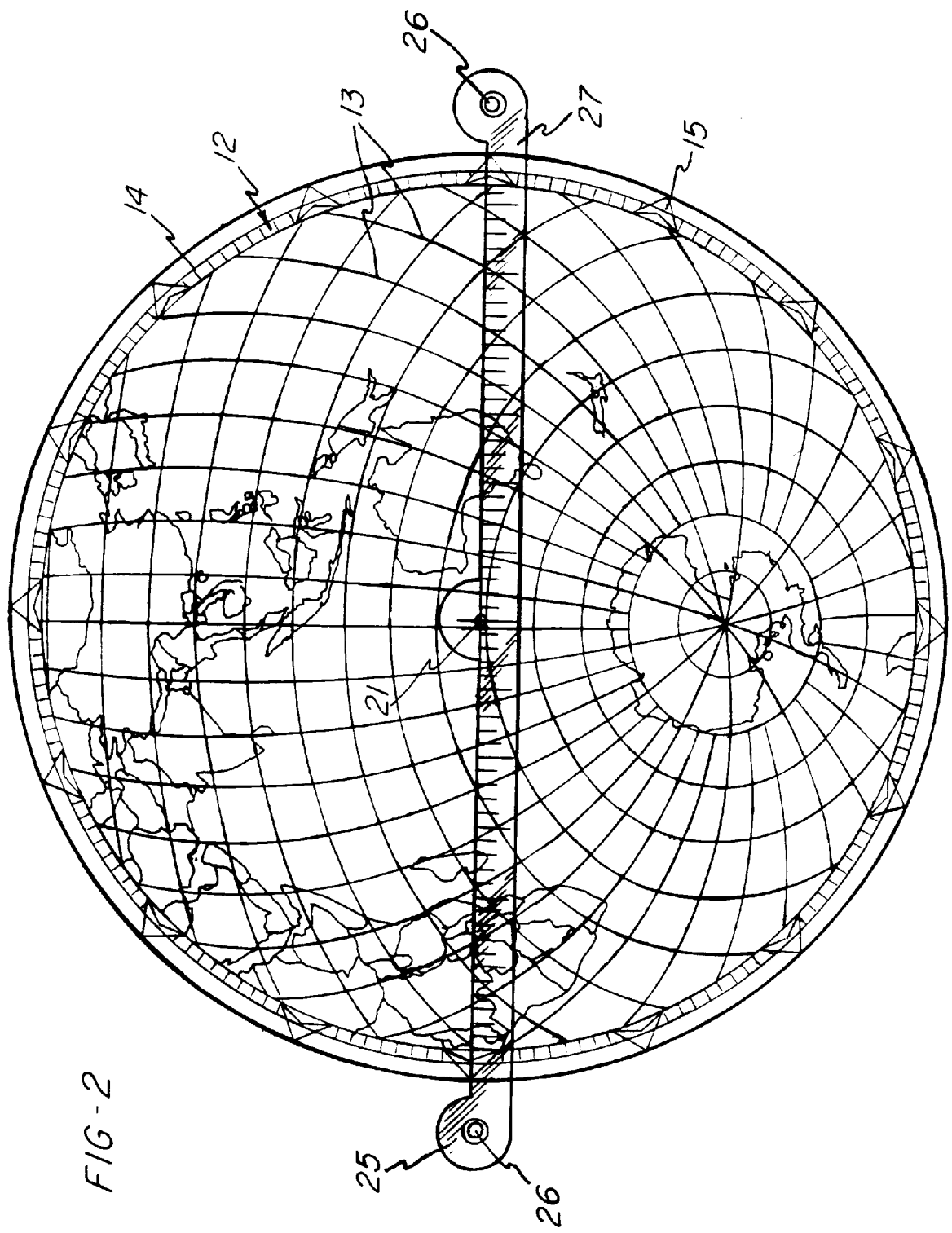
FIG. 2 is a plan view of the reverse side of the device of FIG. 1.

Referring to figures of the drawing, which illustrate preferred embodiments of the invention, a flat two-sided map of a planet, such as the earth, is illustrated in FIGS. 1 and 2, in which FIG. 1. represents an obverse side 10 of the map, and FIG. 2 represents the reverse side 12. One side, such as the obverse side 10, contains a pictorial planar representation of one hemisphere while the other side represents the opposite hemisphere. Each side is projected to the same scale and in each representation, the meridian lines 13, which may or may not be illustrated, of each hemisphere, extend to the peripheral margin 14 or to a common peripheral location while, on the reverse side, the corresponding meridian lines join at corresponding locations on the peripheral map margin as a continuation.

Specifically, the reverse side is a projection which is centered on the antipode of the projection of the obverse side 10, it is projected at the same scale, and the corresponding meridian lines 13 are matched at the congruent margins 14.

The pictorial representation on the two-sided map device of this invention provides the impression that one is looking at a globe and seeing one hemisphere from one side and the remaining hemisphere from the other side.

As noted in FIGS. 1 and 2, the circular map representations may be extended completely to the margins of the flat two-sided map, or a compass rose representation 15 may be printed in encircling manner to the map to help the user orient the points of the compass thereon, to provide an attractive addition to the product, and to permit bearing measurements.

It will also be noted in viewing the representations in FIGS. 1 and 2 and that axis of rotation of the earth has been inclined so that the geographic center of the circle represented on either side, which may be called a center point, is not at a Pole but at another location. In this case, the center point represented at 20 has arbitrarily been located at Washington, D.C. on the obverse side 10 and its antipode 21 is seen on the reverse side 12. In a preferred embodiment, a scale 25 is pivotally mounted such as by a rivet at 20. The scale 25 is formed with two sides joined together by rivets 26 at ends 27 that extend beyond the periphery. A scale may be formed with uniformly spaced graduations or indicia 30 which represent distance, such as in statute or nautical miles or kilometers, with zero at the center point 20, also the point of pivotal movement of the scale 25.

While a scale 25 may be made as a single arm extending radially from, a desired or given center point or pivot 20, it is preferable that the scale 25 be double ended, as shown, as its use is thereby simplified. It also should be noted that projections other than as azimuthal equidistant may be used as long as the same projection is used on both sides and both sides are made to the same scale. Also the center point 20 may be centered at arbitrary points around the world other than as shown, and since this product could be specifically designed for use for measurements from any given location. In laying out or generating the graphics represented on the obverse and reverse sides, a particularly useful program is the Geocart Software sold by Terra Data Incorporated, Crouton-on-Hudson, N.Y.

The scale 25 is preferably formed of a transparent plastic material. The reverse side of the scale, at the pivot point 20, represents the exact location of the antipode of Washington, D.C., selected for the point 20 on the obverse side. As the scale is pivoted angularly about this pivot point, great circle measurements can be taken from the point 20 outwardly to the peripheral margin and continued on the reverse side inwardly to the antipode 21. The scale may be marked with zero at the point 20 with the circumferential distance at the peripheral margin of the hemispherical image with increasing mileage or linear distance shown on the reverse side of the scale, illustrated in FIG. 2, inwardly to the antipode at which point the mileage would, of course, be the maximum. In case of statute miles, this would be about 6,250. By rotating the scale in azimuth, one can measure the distance from the center point 20 to any point and from there to the edge 14 of the map. At the same time, one edge 32 of the scale 25 exactly bisects the point 20 and forms a straight line, the intersection of line 32 to the surrounding optional compass rose 15 may be used to indicate true bearings to distant points. The distances as marked on the scale 25 are equally spaced and thus represent the shortest distance from the center point 20 to any point on the projection, and a line drawn from the center would also indicate the path to be taken when following such a great circle route. While an azimuthal equidistant projection is preferred, an azimuthal equi-area projection may be used, in which case the markings on the scale 25 would not be linear.

FIGS. 3 and 4 illustrate a modified form of the scale used with the flat two-sided circular map of FIGS. 1 and 2. In FIG. 3, the scale 50 is formed with a length which exceeds the map diameter and is formed in two sections which, together, define an interior slot or opening 52 within which the circular map of FIG. 1, 2 may be received. The scale 50 is formed in two sections, namely, an upper section 56 and a lower section 58 which are mated and held together by end clips 60 one at each of the opposite ends. The sections 56 and 58 together define an interior slot 52 and when located on the map, the section 56 will overlie one map face and the section 58 will overlie the opposite face. A rivet 64 extends through the map, at the center point of interest 20, and through the scale 50. The scale 50 will pivot about the rivet 64.

As a further feature, an antipode locating device includes a first or upper marker 70 mounted on a thread 72. The thread 72 extends through apertures 77 located in the opposite ends of the scale 50 beyond the slot 52 and forms a closed loop and engage a second marker 80 at the opposite side of the scale. In this instance, each section 56,58 of the scale 50 is formed with a longitudinal straight line slot 90 as illustrated in FIG. 3, and the markers 70 and 80 move along these slots. The slot 90 therefore extends radially from the pivot 64 and movement of one of the markers 70 or 80 in one direction along the slot 90 causes a corresponding reverse movement of the other marker, which will be located on the opposed or reverse side of the map. In this manner, the marker 70 may be moved along the slot 90 to a given location on the map and marker 80 will have been caused to move to a position on the opposite surface representing the antipode of the position of marker 70. In other respects, the scale 50 may be provided with graduations representing linear measurements, as described above in the case of the scale 25. Scale 50, without the connector loop thread 72 and the indicators 70 and 80, may be used to mark through the slot 90 by and erasable marker directly onto one or the other of the map surfaces, to delineate a route or a straight line from the center point of interest 20. The thread loop 72 may be formed of a monofilament material.

Figure 5:
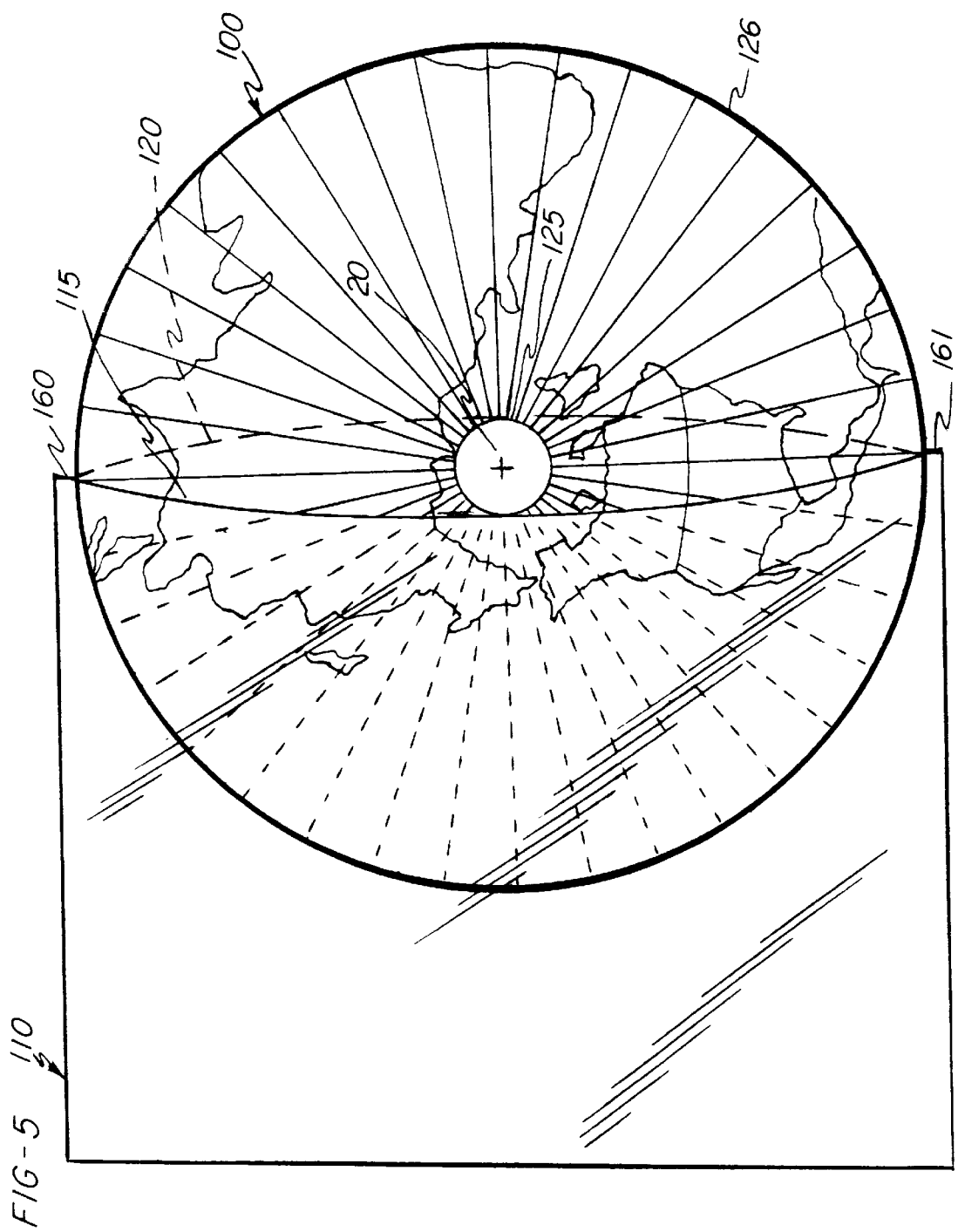
FIG. 5 is a further embodiment of the invention showing the application of a sleeve to a polar representation of the earth to represent the delineation of daytime and nighttime.

The invention also includes an arrangement of components by which the transition between daylight and nighttime at various points on a globe may be dramatically illustrated. For this purpose, a two-sided flat map 100, as shown in FIG. 5, is formed as a pair of polar projections of hemispheres, joined together in back-to-back relation, as previously described. However, the center point 20 is at a Pole. A semi-transparent sleeve 110 is provided with a size sufficient to be slipped over the map 100 and to permit the map to be rotated when partially recessed within the sleeve 110 and partially extended, as shown in Fib. 5, about the axis of the Pole 20. The sleeve is formed with edges 115 or one side and 120 on the other side which, together with the map 100, delineate regions of light and dark.

It will be noted that the sleeve edges 115, 120 are curved so that they are tangent to intersect the Arctic Circle 125. This curved line or edge 115, 120, extends from the Arctic Circle to the Equator 126 (the map periphery) and is used for indicating the relative positive of light and dark for the summer and winter solstice. Actually, the exact shape of the curved lines 115,120 will depend upon the map projection used and will depend upon whether the solstice condition or the equinox condition is depicted. The equinox position would simply be a straight line passing across the Poles from edge to edge, while a solstice position shows the relative areas of light and dark for the obverse side at line 115 and for the reverse side at line 120. To go from summer to winter solstice, it is only necessary to turn over the semi-transparent envelope 110 with respect to the map 100. The envelope 110 may be supported on the map, in combination with the scale 50, by pivoting the corners 160 and 161 of the envelope in indented recesses 165 formed in the extended ends of the scale. As the map 100 is rotated counterclockwise, in the northern hemisphere, thereby clockwise in the southern hemisphere, the progressive coverage of the envelope represents nighttime and where the envelope does not cover, represents daytime.

It will therefore be seen that this invention provides a useful tool, an education device, and a measuring instrument which uniquely presents a globe and permits interesting great circle measurements and bearing indications from various points represented as center points on a hemisphere.

The ability to provide a representation on a global scale of any particular point of interest and, simultaneously, provide a designation of the antipode, in a two-sided flat presentation, provides possibilities for uses in advertising and education. The map and material making up the map may be made of coated materials which can be marked on, drawn on, and erased. The device may also be used as a promotional or advertising piece in which this center point is positioned at a unique or particular location being promoted.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A calculator for measuring global great circle distances radially from any given point on earth comprising a two-sided map projection in planar form having an obverse side and a reverse side, said given point being centrally located on said obverse side such that the antipode is immediately opposite on the reverse side, said map projection being substantially azimuth equidistant with each said sides covering an area approximating 50% of the earth, and a substantially linear scale having one side extending along said obverse surface and an opposite side extending linearly along said reverse surface immediately behind said one side in a straight line from said central point to the margins of said map and scaled to indicate distance from said center point, along said one side, said second side being similarly scaled to indicate distance in accumulation to the distance scaled on said one side, said scale being rotatable about a pivot point coincidental with said center point so that great circle distances in any direction from said center point to a destination may be calculated by rotating said scale about said pivot point, locating said destination on said scale, and reading said distance.

2. The calculator of claim 1 in which each side of said scale is formed with a slot extending substantially along the length thereof such that said slots are aligned opposite each other on either side of said map, a pair of moveable indicators slidably received in said slots, one on each of said sides, and a cord-like member interconnecting said indicators in a common loop such that movement of one of said indicators in its associated said slot causes a reverse movement of the other of said indicators in its associated said slot whereby the movement of one of said indicators along said slot is represented by the movement of the other of said indicators to positions antipodal to said one indicator.

3. A great circle distance calculator comprising a two-sided generally circular map in which a first side thereof has representation of a hemispherical portion of the earth with the center thereof located at a given point of interest and the second surface thereof having a representation of the opposite hemispherical portion of the earth having a center thereof defining an antipode to said point of interest, a two-sided scale extending substantially the diameter of said map in a straight line and having a first side positioned at one side of said map and having a second aligned with said one side along the opposite side of said map, said scale being pivoted on said map at said point of interest, said scale being scaled in distance markers which begin at said point of interest and increase in either direction from said point of interest along said first side with a continuation of said markers continuing on said second side to a maximum distance indication at said antipode.

4. The calculator of claim 3 in which said map is based substantially on an azimuth equidistant projection, and said distance markers are uniformly spaced along said scale.

5. Apparatus comprising a flat member having a first side and an opposed second side, said first side defining a first congruent margin and said second side defining a second congruent margin, said apparatus bearing a map of the earth in which a first hemisphere is illustrated on said first side and a second hemisphere is illustrated on said second side, in which said first and second hemispheres are each projected to the same scale, and in which the meridian lines of said first hemisphere terminate at said first congruent margin at locations which are immediately opposite the termination of the same meridian lines of said second hemisphere at said second congruent margin.

6. The map of claim 5 in which each of said first and second hemispheres is formed inside a compass rose.

7. The apparatus according to claim 5 further comprising a sleeve proportioned to receive said member partially therein and to permit further rotation of said member, said sleeve terminating in lines which extend across each of said first and second sides and represent the transition from daytime to nighttime as said substrate is rotated in said sleeve.

8. Apparatus comprising a circular flat member comprising a flat substrate having an obverse side and a reverse side, said obverse side defining a first circular margin and said reverse side defining a second circular margin, said circular flat member bearing a representation of a planet in which a first hemisphere is represented on the obverse side in an azimuthal equidistant projection and in which a second hemisphere is represented on the reverse side in the same projection and to the same scale as said obverse side, and in which like areas of the planet represented at the first circular margin merge with the corresponding areas of the planet at the second circular margin.

* * * * *